United States Patent [19]

McFrisby

[11] Patent Number: 4,552,371
[45] Date of Patent: Nov. 12, 1985

[54] SCREWLESS COLLAPSIBLE SLED, AND METHODS OF CONSTRUCTING AND UTILIZING SAME

[75] Inventor: Samuel J. McFrisby, Ecorse, Mich.

[73] Assignee: Joseph A. Ulicne, Grosse Ile, Mich.; a part interest

[21] Appl. No.: 495,985

[22] Filed: May 19, 1983

Related U.S. Application Data

[63] Continuation-in-part of Ser. No. 304,244, Sep. 21, 1981, abandoned.

[51] Int. Cl.⁴ .............................................. B62B 13/16
[52] U.S. Cl. ......................................... 280/20; 280/15
[58] Field of Search ..................... 280/125, 15, 19, 20, 280/39, 651; 108/34, 35, 36

[56] References Cited

U.S. PATENT DOCUMENTS

| | | | |
|---|---|---|---|
| 1,050,396 | 1/1913 | Schneider | 280/19 |
| 1,378,598 | 5/1921 | Meyers | 280/39 |
| 2,436,056 | 2/1948 | Prothro | 108/34 |
| 2,472,920 | 6/1949 | Peenstra | 280/20 |
| 2,522,642 | 9/1950 | Schmidt | 108/36 |
| 2,647,562 | 8/1953 | Hoffar | 108/35 |
| 2,827,352 | 3/1958 | Boyajian | 108/35 |
| 4,079,953 | 3/1978 | Howarth | 280/19 |
| 4,243,238 | 1/1981 | Johnson | 280/20 |
| 4,378,828 | 4/1983 | Shiminski | 108/35 |

FOREIGN PATENT DOCUMENTS

| | | | |
|---|---|---|---|
| 1271601 | 8/1961 | France | 280/39 |

*Primary Examiner*—Joseph F. Peters, Jr.
*Assistant Examiner*—J. McCarthy
*Attorney, Agent, or Firm*—Irving M. Weiner; Joseph P. Carrier; John J. Cantarella

[57] ABSTRACT

A collapsible sled for transporting articles comprising a pair of box-like sections within each of which there is pivotably mounted a pair of runners. The runners can be pivoted so as to be completely received within the box-like sections for transport, and the box-like sections can be closed upon each other to form a complete box with the runners disposed therein. Fasteners including a plurality of keepers for slidably receiving a plurality of locking members, respectively, are provided for securing the runners and the box-like sections in their operable positions. The fasteners eliminate any need for conventional threaded fasteners, are very convenient to use, and provide a strong and effective fastening arrangement.

18 Claims, 3 Drawing Figures

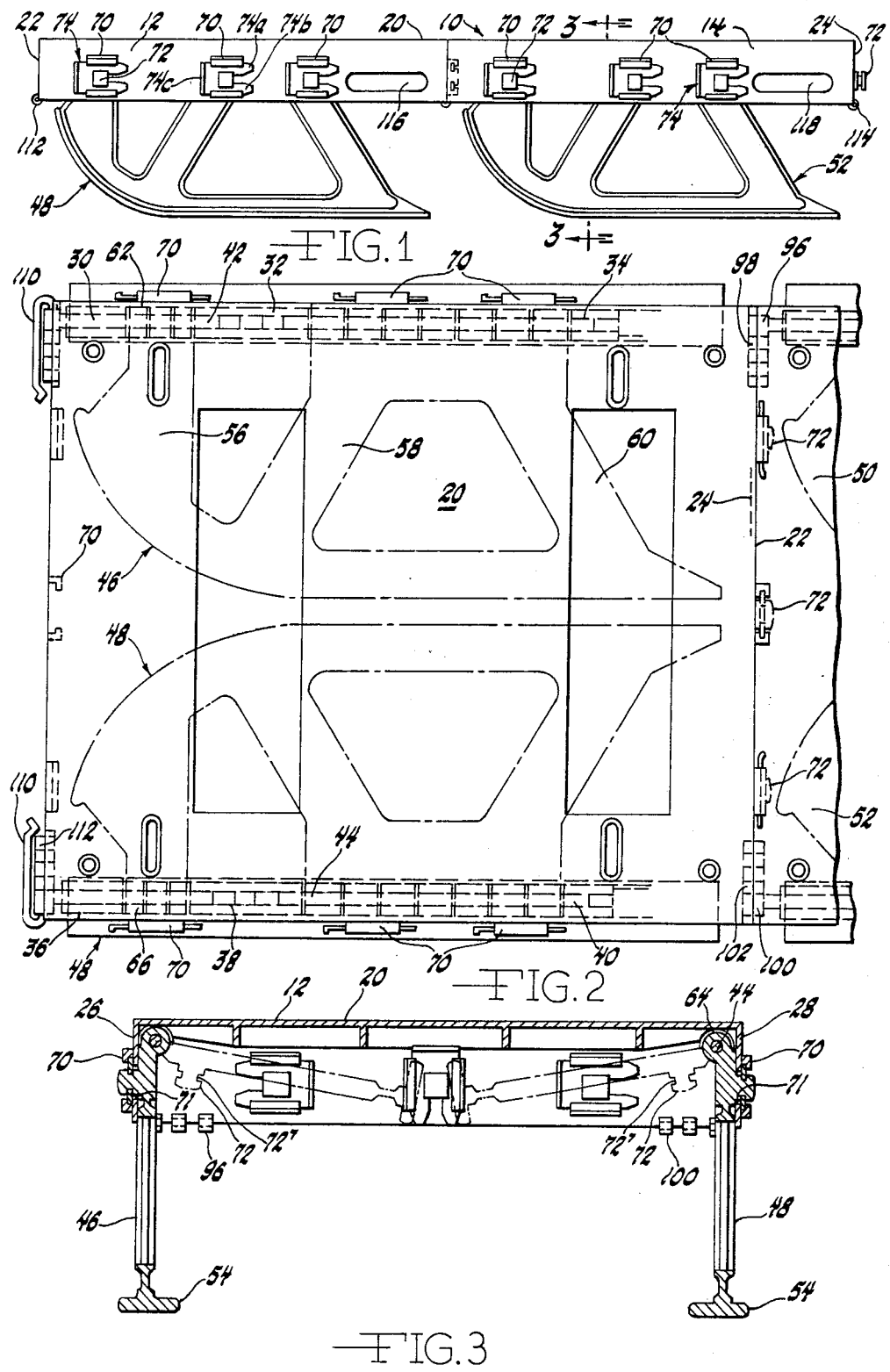

SCREWLESS COLLAPSIBLE SLED, AND METHODS OF CONSTRUCTING AND UTILIZING SAME

This is a continuation-in-part of application Ser. No. 304,244, filed Sept. 21, 1981, abandoned in favor of continuation application Ser. No. 533,178, filed Dec. 16, 1983, now abandoned, the disclosures of which are incorporated herein by reference thereto.

BACKGROUND OF THE INVENTION

1. Field of the Invention

The present invention relates generally to a sled for use in transporting equipment, such as hunting and camping equipment, and animals, including game, etc., over snow covered terrain. More particularly, the invention relates to an improved collapsible sled which facilitates the transport of game, supplies or the like to and from hunting locations, camping sites, etc., and which is collapsible so as to facilitate transport of the sled when not in use. The collapsible sled is provided with novel fastening means which eliminate any need for conventional threaded fastening members such as screws, bolts and nuts.

2. Description of Relevant Art

In various sporting activities including hunting and camping, for example, the transport of game or equipment ofttimes proves to be very difficult, particularly if the terrain is difficult to traverse, long distances are involved, and/or the articles to be transported are particularly heavy or cumbersome. Although a number of sled constructions have been proposed for such purposes, such constructions have generally proven to be cumbersome, complex, and costly. Such known sled constructions have also proven disadvantageous with respect to transport thereof when not in use, inasmuch as they are undesirably heavy and consume considerable space, particularly when they are provided with undesirably exposed runners, joints and frame members or the like.

One known device is disclosed in U.S. Pat. No. 2,472,920 issued in 1949 to Peenstra and entitled "FOLDING SLED". The folding sled disclosed therein is particularly adapted for use by children, and includes front and rear pairs of runners attached to a foldable platform. The runners are maintained in an open or closed position by toggle links associated with slide blocks which fit in guides.

U.S. Pat. No. 2,673,744 issued in 1954 to Johnson entitled "FOLDABLE PORTABLE SLED" discloses a sled construction which includes a front unit and a rear unit. The units are provided with pairs of runners and angle bracket-like support members which extend upwardly from the runners. The forward section and the rearward section are pivotally connected so that they can be folded one upon the other to reduce the length of the sled. When folded, the rear section nests within the forward section.

U.S. Pat. No. 3,580,592 issued in 1971 to Schrecengost entitled "COMBINATION DEER-CARCASS SLED AND CHAISE LOUNGE" discloses a sled device for conveying carcasses that is convertible into a chaise lounge. The device includes a frame having two parts which are hinged together for relative folding. A deck is formed on the frame by strung cord and there is also provided a cross piece. The sled includes a rear swivel leg and a pair of yokes and associated runners forwardly thereof. In its folded condition, the rear swivel leg is swung toward the front of the sled and rotated into a collapsed condition. The yokes and associated runners are swung outwardly and upwardly to rest on the top of the deck of the folded frame.

U.S. Pat. No. 3,583,722 issued in 1971 to Jacobson entitled "COLLAPSIBLE BOBSLED" discloses a sled construction having a platform which has forward, intermediate and rear foldable sections. The forward and rear ends of the platform are provided with plates which are adapted to releasably secure a detachable runner. When the sled is collapsed and folded, there is defined a generally U-shaped configuration by the folded forward, intermediate and rear sections of the platform.

Each of the particular known devices set forth hereinabove have one or more of the various disadvantages discussed hereinabove, and thus have not proven to be generally acceptable.

The present invention effectively overcomes the various disadvantages attendant the conventional constructions, and at the same time provides a simplified and lightweight construction which is reduced in cost.

SUMMARY OF THE INVENTION

The present invention provides a collapsible sled for transporting articles which comprises a front section and a rear section which are pivotably interconnected such that one section is pivotal with respect to the other through an arc of approximately 180°. Each section comprises a box-like member which includes a support platform, front and rear depending walls, and opposite side walls, and each has a pair of runners pivotably connected thereto by hinge means. Each runner is pivotal from a position in which it is entirely received within the box-like member to an operable position in which the runner extends downwardly from and substantially perpendicularly to the platform. First means are provided for locking the front and rear sections together in a collapsed condition with the runners disposed therein, second means are provided for locking the runners in the operable position thereof, and third means are provided for locking the front and rear sections in an open operable position. The second and third means each comprise a locking member which is slidably received in a keeper member.

The second and third means preferably comprise a plurality of spaced apart keeper members, each having an aperture provided adjacent thereto. Projections are provided for projecting through the apertures, each projection including a pair of opposite grooves. A plurality of the locking members are provided which correspond in number to the number of keeper members, and each locking member is slidably receivable in one of the keeper members so as to operatively cooperate with the keeper member and a corresponding one of the projections so as to provide a fastening or locking arrangement which eliminates any need for conventional threaded fastening means.

It is an object of the present invention to provide a collapsible and lightweight sled which may be easily collapsed into a compact and readily transportable box-like configuration, and easily assembled in an operable condition by incorporating the second and third means to lock respective members in their operable positions without any need for conventional threaded fasteners.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a side elevational view of a sled in accordance with the present invention, shown in its operable condition.

FIG. 2 is a top plan view showing the forward section of the sled.

FIG. 3 is a sectional view taken along line 3—3 of FIG. 1.

DETAILED DESCRIPTION OF PREFERRED EMBODIMENTS

With reference to FIG. 1, a collapsible sled 10 in accordance with the present invention is shown in its operable condition ready for use in transporting game, equipment or the like. The sled 10 comprises a front section 12 and a rear section 14, which sections are substantially identical in construction. Thus, the descriptive features set forth hereinbelow with respect to one section apply substantially equally to the other of the sections.

As shown in FIGS. 1-3, each of the front and rear sections 12, 14 includes an upper support platform 20, a front depending wall 22, a rear depending wall 24, and opposite side walls 26 and 28, respectively. The front, rear and side walls cooperate with the support platform 20 to form a box-like enclosure for each of the sections 12 and 14.

Within the enclosures thus formed there is provided a series of hinges 30, 32 and 34, and 36, 38 and 40, as shown in FIG. 2. The hinges 30, 32 and 34 provided within one side of the enclosure receive an elongated hinge pin 42; while the hinges 36, 38 and 40 provided within the opposite side of the enclosure receive an elongated hinge pin 44. The hinge pins 42 and 44 are formed of extruded plastic rods, and respectively pivotably support runners 46 and 48 of the front section 12 (and in a like manner, runners 50 and 52 of the rear section 14). The hinge pins 42 and 44, as well as the mating hinges, are dimensioned such that the inner ends of the hinge pins are force fitted into hinge members 30 and 36 to further secure the hinge pins.

Each of the runners 46, 48, 50 and 52 comprise blades 54 and supporting braces or frame members 56, 58 and 60. The frame members of the runners include hinge member pairs 62, 64 and 66, 68, which respectively receive the hinge pins 42 and 44 so as to pivotably secure the runners to each of the front and rear sections 12 and 14.

As illustrated in FIGS. 1-3, the runners 46, 48, 50 and 52 can be pivoted from a position in which they are received within the box-like enclosures (the dotted-line position of the runners shown in FIG. 3), to an operable position in which they are extended for sledding (FIG. 1 and the solid-line position shown in FIG. 3).

With the runners pivoted to the dotted-line position shown in FIGS. 2 and 3, they are disposed entirely within the box-like enclosures of the front and rear sections 12 and 14, and simply rest therein.

To secure the runners in their downwardly-depending operable position for sledding, the present invention provides novel fastening means which eliminate any need for conventional threaded fastening members such as screws, bolts and nuts. It will be understood that each component part of the fastening means described hereinbelow, as well as other component parts of the sled, are formed of a weather-resistant material which will not become brittle when subjected to very cold temperatures, such as, for example, polyethylene plastic.

The novel fastening means in accordance with the invention will now be described hereinbelow.

As shown in FIGS. 1 and 3, a plurality of keeper members 70 (i.e., three in the illustrated embodiment) are provided on the outside surface of each of the side walls 26 and 28 of each of the front and rear sections 12 and 14. Each of the keepers 70 comprise a pair of opposing flanges which extend integrally outwardly from the side walls 26 and 28 with their length dimensions extending in the longitudinal direction of the sled so as to taper slightly inwardly, each of the flanges having a substantially L-shaped cross section as shown in FIG. 3. The opposing flanges of each keeper 70 extend integrally outwardly from respective opposite sides of an aperture 71 formed in the side wall (FIG. 3).

As also shown in FIGS. 1 and 3, each of the frame members 56, 58 and 60 of each of the runners is provided with a projection 72 formed on an upper outer surface thereof. The projections 72 are arranged so as to correspond in position to the apertures 71 provided between the opposing flanges of the keepers 70, and are dimensioned so as to be respectively received through a corresponding aperture 71 when the runners are pivoted to their downwardly-depending operable positions. Each of the projections 72 of the runners are formed with opposing grooves 72' extending in the longitudinal direction of the sled, which grooves 72' will be positioned just outside of the outer surface of the side walls 26 or 28 when the runners are lowered to their operable positions with projections 72 extending through apertures 71, as shown in FIG. 3.

With the projections 72 thus received within the apertures 71, a wedge-like locking member 74 is employed to securely fasten each of the projections within the respective apertures 71. A plurality of the locking members 74 are provided which correspond in number to the number of keepers 70 and projections 72. Each locking member 74 is substantially flat and comprises a pair of prongs 74a and 74b as shown in FIG. 1, the prongs 74a and 74b being spaced so as to define a recess therebetween and being slightly tapered at their ends. On the end of locking member 74 opposite to the extending ends of prongs 74a, 74b is provided a projection 74c, as also shown in FIG. 1.

The locking members 74 are slidably inserted within the respective keepers 70 such that the outer slightly-tapered surfaces of the prongs 74a, 74b abut against the inner slightly-tapered surfaces of the opposing flanges of the keepers 70. Such tapering configuration of locking members 74 and keepers 70 facilitates insertion of the locking members 74 into the keepers 70 on the one hand, while ensuring a locking fit of the fully-inserted locking members 74 within the keepers 70 on the other hand. The projection 74c of the locking member 74 facilitates insertion and removal of the locking member 74 relative to the keeper 70.

With the locking members 74 respectively operably inserted within keepers 70 as described hereinabove, the inner portions of the prongs 74a, 74b of locking members 74 will be tightly received within the grooves 72' of the runner projections 72, and at the same time the prongs 74a, 74b will be tightly received between the L-shaped flanges of the keeper 70 and an outer surface portion of the side wall 26 or 28 surrounding aperture 71, as shown in FIG. 3. With the locking members 74 disposed in their thus-wedged operable positions, the runners are locked in their downwardly-depending operable position. If desired, the inner surfaces of the prongs 74a, 74b may be provided with projections at the ends thereof (not shown) which mate with corresponding slits formed in the side walls 26, 28 to further enhance locking of the locking members 74 within the keepers 70.

To return the runners to their folded inoperable positions within the box-like enclosures of the front and rear sled sections 12, 14, the user need merely remove each of the locking members 74 by slidably retracting same from within the keepers 70.

The collapsible sled in accordance with the present invention is collapsible not only with respect to the pivotable runners as described hereinabove, but also with respect to the front and rear sections 12, 14 relative to each other. To this end, the sections 12 and 14 are provided with mating hinge plates 96, 98, 100 and 102 (FIG. 2), which are pivotably interconnected by hinge pins. The sections 12 and 14 are further provided with a pair of mating hinge plates at their opposite ends, i.e., hinge plates 112, 112 provided on section 12 (FIGS. 1 and 2) and a pair of hinge plates 114, 114 provided on section 14 (only one of which is shown in FIG. 1).

In use, the hinge plates 96–102 cooperate with hinge pins 104 and 106 to permit pivotable movement of the sections 12 and 14 relative to each other. Such hinge arrangement permits relative pivotable movement of the sections 12, 14 from the open operable position shown in FIG. 1 to a closed or collapsed position for transport of the sled in a non-operable condition. When the sections 12 and 14 are to be closed, the runners are first pivotably moved into a resting position within the box-like enclosures as described hereinabove (i.e., the dashed line position shown in FIGS. 2 and 3), and the sections 12 and 14 are folded or closed relative to each other such that the lower edge of the rear wall 24 of the rear section 14 comes into contact with the lower edge of the front wall 22 of front section 12. In this position, the hinge plates 112, 112 are brought into alignment with the hinge plates 114, 114, and removable hinge pins 110 (FIG. 2) are employed to interconnect the thus-aligned hinge plates, and thereby fasten the sections together in their closed relative positions. In such condition, the box-like enclosures of the front and rear sections 12, 14 cooperate in their closed or collapsed relation to define an overall box-shaped configuration which greatly facilitates transport of the sled when it is not in use. The front and rear sections 12, 14 may preferably be provided with suitable openings 116, 118, respectively, which serve as hand holds so as to facilitate movement of the sled in its collapsed condition.

When it is desired to employ the thus-collapsed sled in its operable condition, the removable hinge pins 110 are first removed so as to permit sections 12, 14 to be opened relative to each other. To secure the sections in their opened operable condition, the novel fastening means in accordance with the invention as described hereinabove are also provided for the rear wall 24 of front section 12 and the mating front wall 22 of rear section 14. As shown in FIGS. 1 and 2, a plurality of the keepers 70 are provided to extend integrally from the inside of the front walls 22 of each of the sections 12 and 14 (i.e., three keepers 70 for each front wall 22 in the illustrated embodiment). A plurality of the projections 72 are in turn provided to extend integrally from the outside surface of the rear walls 24 of each of the sections 12 and 14. A corresponding number of locking members 74 are also provided.

In use, with the sections 12, 14 in their open condition, the projections 72 provided on the rear wall 24 of front section 12 will project through the corresponding apertures 71 provided between the flanges of the keepers 70 on the inside surface of front wall 22 of rear section 14. The locking members 74 are then inserted into the keepers 70 in the same manner as described hereinabove. As shown in FIG. 2, the central keeper 70 of the front wall 22 extends at a right angle relative to the other two keepers 70 of front wall 22, thus enhancing the locking effect of the fastening arrangement. When the three locking members 74 have been suitably inserted within the corresponding keepers 70 of front wall 22, the front and rear sections 12 and 14 will be securely locked in their open operable positions relative to each other. Next, the user need only pivot the runners to their operable positions and insert the locking members 74 into their corresponding keepers 70 in the above-described manner in order to lock the runners in position and complete preparation of the sled for use.

It is to be noted that the provision of keepers 70 on the inside surface of the front wall 22 of each of the sections 12, 14 and the provision of projections 72 on the outside surface of the rear wall 24 of each of the sections 12, 14 provides for interchangeability of the front and rear sections relative to each other, and even the connection of additional sections (not shown) if so desired.

Each of the sections 12 and 14 may also preferably be provided with suitably-disposed rope openings for receiving rope for towing the sled. Further, it will be understood that the entire sled, including the runners and the fastening means, are preferably formed of a weather-resistant material, such as polyethylene plastic, which can withstand severe weather conditions.

From the foregoing it will be understood that the collapsible sled in accordance with the present invention may be easily collapsed or set-up for use as desired. The sled in its collapsed condition defines a convenient and easily transportable box-like configuration in which the runners are protected from damage. The collapsed sled may be rapidly and conveniently assembled in its operable condition when desired, and in such operable condition the sled is capable of supporting a substantial load.

The novel fastening means in accordance with the invention contribute substantially to the ease of assembly and collapsing of the sled. Such fastening means eliminate the need for inconvenient conventional threaded fastening members, and ensure convenient and effective fastening of the runners and the sections 12, 14 in the operable positions thereof. Further, the locking members 74 are interchangeable one with the other, which further facilitates assembly of the sled in its open operable condition. In addition, the fastening means including the keepers 70, the projections 72 and the locking members 74 are sufficiently strong to ensure a high load-bearing capability as well as an effective locking arrangement.

The sled in accordance with the invention is lightweight and weather-resistant, while employing a minimum number of component parts in a simplified arrangement.

Although there have been described what are at present considered to be the preferred embodiments of the present invention, it will be understood that the invention may be provided in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A collapsible sled for transporting articles, comprising:

a front section and a rear section, said sections being pivotably interconnected;

one of said sections being pivotal with respect to the other through an arc of approximately 180°;

each said section comprising a box-like member which includes front and rear hinge plates, a support platform, front and rear depending walls, and opposite side walls;

each said section having a pair of snow blade runners pivotably directly connected thereto by hinge means;

each said snow blade runner being pivotal from a position in which it is entirely received within said box-like member to an operable position in which said snow blade runner extends downwardly from and substantially perpendicularly to said platform;

first means comprising a removable hinge pin and said front and rear hinge plates for locking said front and rear sections together in a collapsed condition with said snow blade runners disposed therein;

second means on the outside surface of said side walls for locking said snow blade runners in said operable position;

third means on the inside surface of said front wall of said rear section for locking said front and rear sections in an open operable position; and each said second and third means comprising a locking member which is slidably received in a keeper member.

2. A collapsible sled for transporting articles, comprising:

a front section and a rear section, said sections being pivotably interconnected;

one of said sections being pivotable with respect to the other through an arc of approximately 180°;

each said section comprising a box-like member which includes a support platform, front and rear depending walls, and opposite side walls;

each said section having a pair of runners pivotally connected thereto by hinge means;

each said runner being pivotal from a position in which it is entirely received within said box-like member to an operable position in which said runner extends downwardly from and substantially perpendicularly to said platform;

first means for locking said front and rear sections together in a collapsed condition with said runners disposed therein;

second means for locking said runners in said operable position;

third means for locking said front and rear sections in an open operable position;

each said second and third means comprising a locking member which is slidably received in a keeper member;

said second means comprising:

a plurality of said keeper members, said keeper members being arranged in spaced positions on outside surfaces of said side walls of said front and rear sections;

said side walls being provided with an aperture adjacent each said keeper member;

said runners being provided with projections arranged in corresponding relation to said apertures such that said projections project through said apertures when said runners are in said operable positions thereof;

a plurality of said locking members, corresponding in number to said keeper members; and each said locking member being slidably receivable in one of said keeper members so as to operatively cooperate with said keeper member and a corresponding one of said projections so as to lock said runner in said operable position.

3. A collapsible sled according to claim 2, wherein:

each said keeper member comprises a pair of oppositely arranged flanges having substantially L-shaped cross sections; and said flanges are provided on opposite respective sides of said aperture in said side wall.

4. A collapsible sled according to claim 3, wherein:

each said locking member comprises a pair of prongs;

each said projection of said runner is provided with a pair of oppositely arranged grooves; and said prongs of said locking member are adapted to be slidably received within said L-shaped flanges of said keeper member and said grooves of said projection.

5. A collapsible sled according to claim 4, wherein:

said flanges of said keeper member and said grooves of said projection are each arranged such that a length dimension thereof extends substantially in the longitudinal direction of said sled.

6. A collapsible sled according to claim 4, wherein:

said prongs of said locking member and said flanges of said keeper member are each tapered.

7. A collapsible sled according to claim 1, wherein:

said second means and said third means are fabricated entirely of a polyethylene plastic material.

8. A collapsible sled for transporting articles, comprising:

a front section and a rear section, said sections being pivotably interconnected;

one of said sections being pivotable with respect to the other through an arc of approximately 180°;

each said section comprising a box-like member which includes a support platform, front and rear depending walls, and opposite side walls;

each said section having a pair of runners pivotally connected thereto by hinge means;

each said runner being pivotal from a position in which it is entirely received within said box-like member to an operable position in which said runner extends downwardly from and substantially perpendicularly to said platform;

first means for locking said front and rear sections together in a collapsed condition with said runners disposed therein;

second means for locking said runners in said operable position;

third means for locking said front and rear sections in an open operable position;

each said second and third means comprising a locking member which is slidably received in a keeper member;

said third means comprising:

a plurality of said keeper members, said keeper members being arranged in spaced positions on inside surfaces of said front wall of said rear section;

said front wall being provided with an aperture adjacent each said keeper member;

said rear wall of said front section being provided with projections arranged in corresponding relation to said apertures such that said projections project through said apertures when said front and rear sections are in said open operable position thereof;

a plurality of locking members, corresponding in number to said keeper members; and each said locking member being slidably receivable in one of said keeper members so as to operatively cooperate with said member and a corresponding one of said projections so as to lock said front and rear sections in said open operable position.

9. A collapsible sled according to claim 8, wherein:

each said keeper member comprises a pair of oppositely arranged flanges having substantially L-shaped cross sections; and said flanges are provided on opposite respective sides of said aperture in said front wall.

10. A collapsible sled according to claim 9, wherein:

each said locking member comprises a pair of prongs;

each said projection of said runner is provided with a pair of oppositely arranged grooves; and said prongs of said locking member are adapted to be slidably received within said L-shaped flanges of said keeper member and said grooves of said projection.

11. A collapsible sled according to claim 10, wherein:

said flanges of said keeper member and said grooves of said projection are each arranged such that a length dimension thereof extends substantially in the lateral direction of said sled.

12. A collapsible sled according to claim 10, wherein:

said prongs of said locking member and said flanges of said keeper member are each tapered.

13. A collapsible sled according to claim 11, wherein:

a further one of said plurality of said keeper members and the grooves of one of said projections corresponding thereto are arranged such that a length dimension thereof extends substantially at right angles to the longitudinal and lateral directions of said sled; and said further one of said keeper members and said projection corresponding thereto are arranged at substantially a central portion of said sled.

14. A collapsible sled according to claim 1, wherein:

said snow blade runners are pivotably directly connected to said box-like members about a pivot axis extending within said box-like members.

15. A collapsible sled according to claim 1, wherein:

said snow blade runners have a pivot axis which is disposed within said box-like member and upwardly of the lower edges thereof; and said snow blade runners are concealed within said box-like members when said snow blade runners are in an inoperable position for transport of said sled.

16. A collapsible sled according to claim 15, wherein:

said box-like members are pivotably connected at adjacent lower edges thereof;

said box-like members are rotatable with respect to each other when said snow blade runners are received therein, into facing contact with each other along their lowermost edges to form a closed box-like configuration with said snow blade runners confined therein; and said box-like members are provided with means for securing said box-like members in said closed position.

17. A collapsible sled for transporting articles, comprising:

a front section and a rear section, said sections being pivotably interconnected;

one of said sections being pivotable with respect to the other through an arc of approximately 180°;

each said section comprising a box-like member which includes a support platform, front and rear depending walls, and opposite side walls;

each said section having a pair of runners pivotally connected thereto by hinge means;

each said runner being pivotal from a position in which it is entirely received within said box-like member to an operable position in which said runner extends downwardly from and substantially perpendicularly to said platform;

first means for locking said front and rear sections together in a collapsed condition with said runners disposed therein;

second means for locking said runners in said operable position;

third means for locking said front and rear sections in an open operable position;

each said second and third means comprising a locking member which is slidably received in a keeper member;

said second means and said third means each comprising a plurality of said locking members and a plurality of said keeper members arranged in spaced apart relation; and said locking members being interchangeable such that each said locking member may be slidably inserted in any one of said keeper members.

18. A collapsible sled according to claim 17, wherein:

each said locking member is substantially flat and includes a pair of prongs extending at one end thereof which are adapted to slidably engage said keeper member; and said locking member includes a projection at the end thereof opposite to said one end, said projection providing a grasping portion for a user of said sled.

* * * * *